United States Patent [19]
Van Rens

[11] Patent Number: 5,285,839
[45] Date of Patent: * Feb. 15, 1994

[54] INTERNAL COMBUSTION ENGINE AND METHOD FOR MAKING SAME

[75] Inventor: Russell J. Van Rens, Milwaukee, Wis.

[73] Assignee: Outboard Marine Corporation, Waukegan, Ill.

[*] Notice: The portion of the term of this patent subsequent to Jul. 16, 2008 has been disclaimed.

[21] Appl. No.: 841,905

[22] Filed: Feb. 26, 1992

Related U.S. Application Data

[63] Continuation of Ser. No. 512,848, Apr. 23, 1990, abandoned.

[51] Int. Cl.[5] .......................... B22C 7/02; B22C 9/04
[52] U.S. Cl. ...................................... 164/34; 164/246; 164/249
[58] Field of Search .................... 164/34, 35, 36, 45, 164/46, 246, 249

[56] References Cited

U.S. PATENT DOCUMENTS

| | | | |
|---|---|---|---|
| 3,635,280 | 1/1972 | Parsons | 164/246 |
| 4,197,899 | 4/1980 | Ernest | 164/34 |
| 4,266,514 | 5/1981 | Tyner | 123/59 |
| 4,632,169 | 12/1986 | Osborn | 164/235 |
| 4,777,997 | 10/1988 | Corbett | 164/45 |
| 4,802,447 | 2/1989 | Corbett | 164/45 |
| 4,951,733 | 8/1990 | Kusche | 164/34 |
| 5,031,685 | 7/1991 | Van Rens | 164/34 |

FOREIGN PATENT DOCUMENTS 62-148055  7/1987  Japan ......................... 164/45

Primary Examiner—Paula A. Bradley
Assistant Examiner—Rex E. Pelto
Attorney, Agent, or Firm—Michael, Best & Friedrich

[57] ABSTRACT

A lost foam pattern assembly comprising a crankcase section including first and second mounting surfaces, a right cylinder section which is fixed to the first mounting surface and which includes a primary locator, a left cylinder section which is fixed to the second mounting surface and which includes a primary locator, a transfer passage having an upper end located in the right cylinder section, and a transfer passage having an upper end located in the left cylinder section.

13 Claims, 4 Drawing Sheets

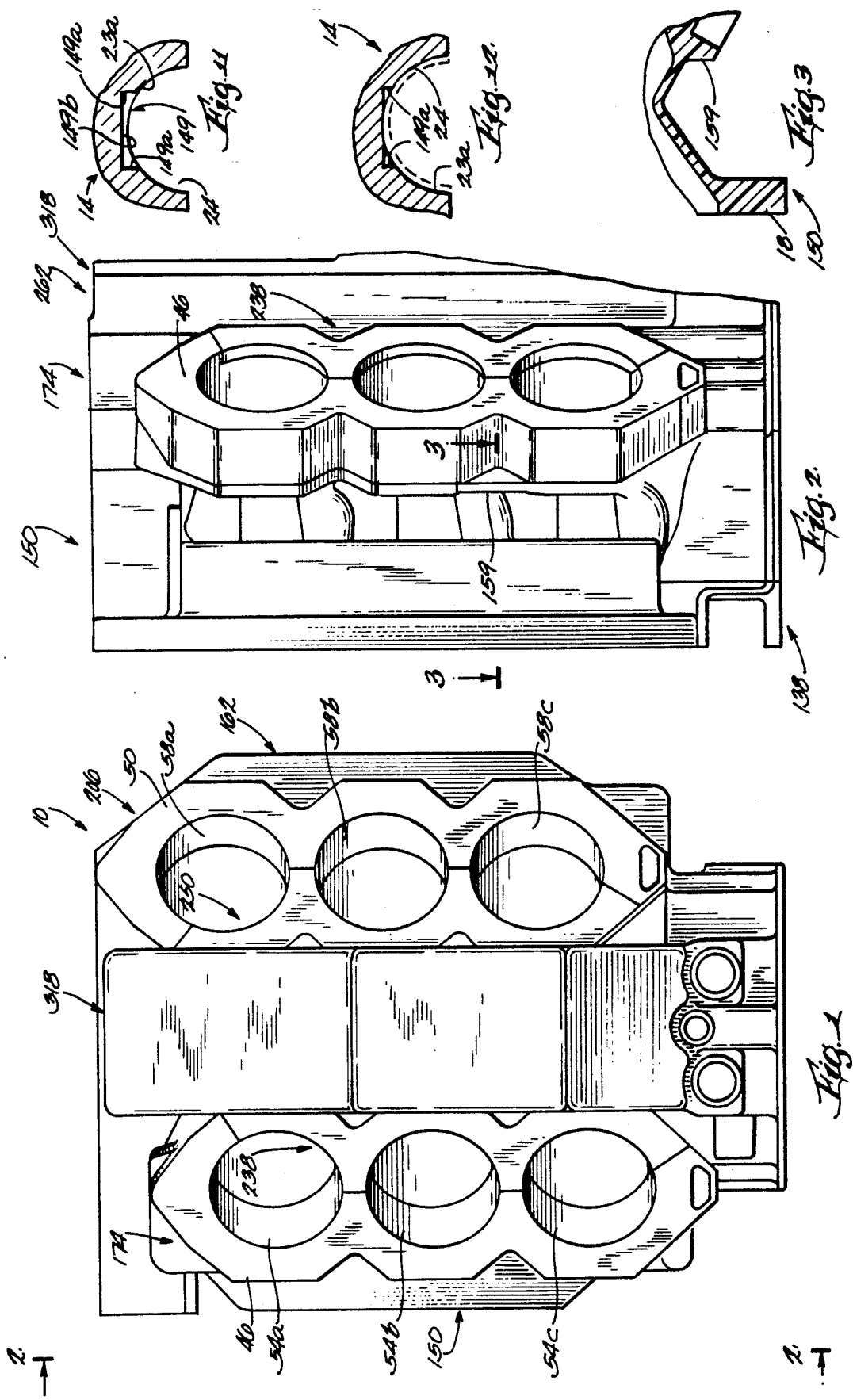

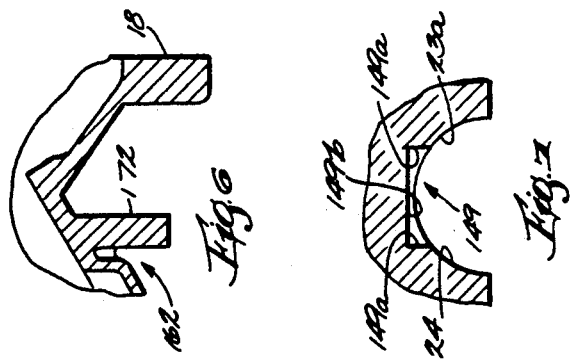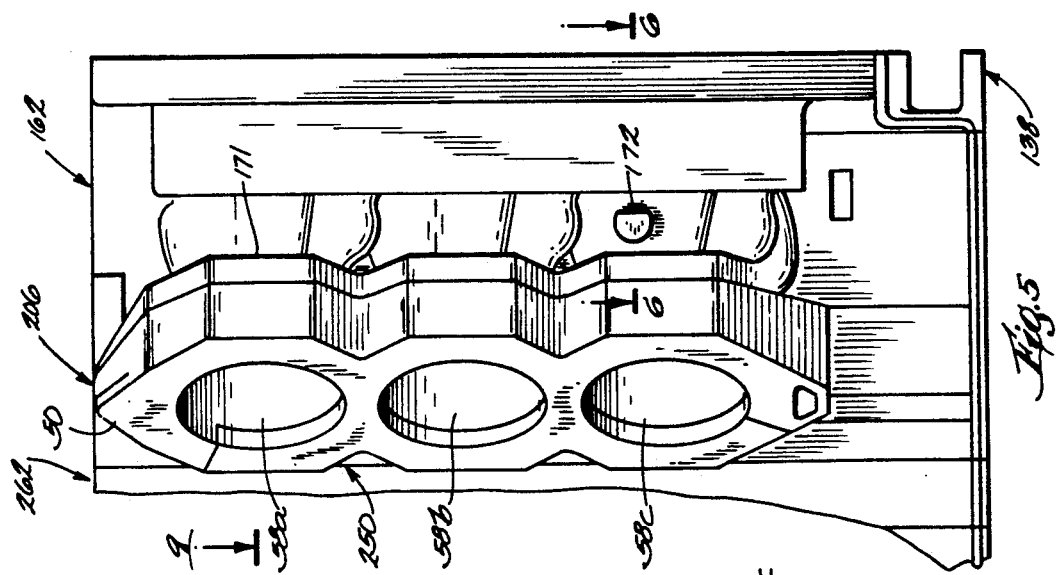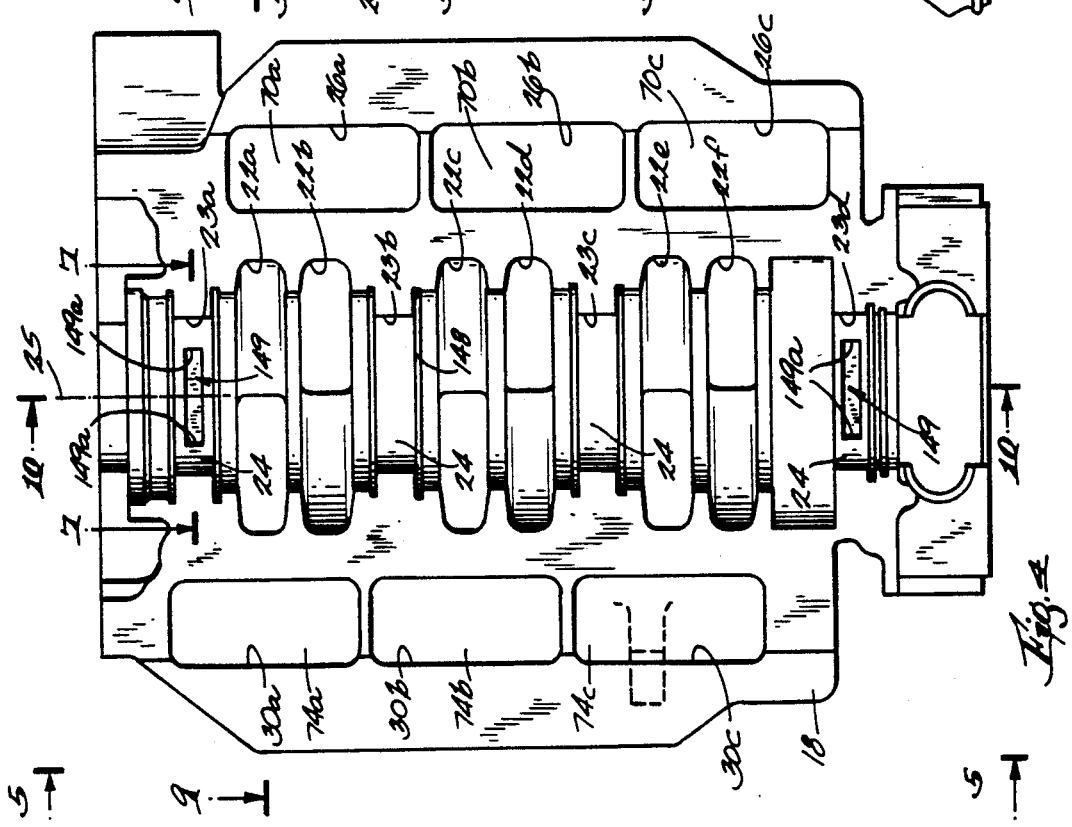

INTERNAL COMBUSTION ENGINE AND METHOD FOR MAKING SAME

This application is a continuation of No. 07/512,848 filed Apr. 23, 1990 which is now abandoned.

RELATED APPLICATIONS

Attention is directed to the following applications which are assigned to the assignee hereof and which are incorporated herein by reference: U.S. Ser. No. 315,900, filed Feb. 27, 1989 now U.S. Pat. No. 5,031,685; U.S. Ser. No. 316,153, filed Feb. 27, 1989 now abandoned; and U.S. Ser. No. 202,970, filed Jun. 3, 1988 now abandoned.

BACKGROUND OF THE INVENTION

The invention relates to internal combustion engines, to lost foam casting processes and to methods for making internal combustion engines with lost foam casting processes. More particularly, the invention relates to foam pattern assemblies for making V-type engine blocks in lost foam casting processes, and to methods for machining engine blocks cast in lost foam casting processes.

SUMMARY OF THE INVENTION

The invention provides a lost foam pattern assembly comprising a crankcase section including first and second mounting surfaces, a right cylinder section which is fixed to the first mounting surface and which includes a primary locator, a left cylinder section which is fixed to the second mounting surface and which includes a primary locator, a transfer passage having an upper end located in the right cylinder section, and a transfer passage having an upper end located in the left cylinder section.

The invention also provides a lost foam pattern portion for use in forming an engine block for a two-stroke internal combustion engine in a lost foam casting process, the pattern portion at least partially defining a cylinder bore and comprising a primary locator, and a transfer passage having an upper end located in the pattern portion.

The invention also provides a method for manufacturing an engine block, the method comprising the steps of providing a lost foam pattern assembly comprising a crankcase section including a front surface and first and second mounting surfaces spaced from the front surface, a right cylinder section which is fixed to the first mounting surface and which includes a primary locator, a left cylinder section which is fixed to the second mounting surface and which includes a primary locator, a transfer passage having an upper end located in the right cylinder section, and a transfer passage having an upper end located in the left cylinder section, utilizing the pattern assembly in a lost foam casting process to produce an engine block including primary locators corresponding to the primary locators of the pattern assembly and a front surface corresponding to the front surface of the pattern assembly, and using the primary locators of the engine block to locate the engine block while machining the front surface of the engine block.

The invention also provides a method for manufacturing an engine block, the method comprising the steps of providing a lost foam pattern assembly comprising a crankcase section including a generally planar front surface having therein a bearing recess defined in part by a generally semicylindrical surface having therein a recess defined in part by generally planar, spaced-apart locator surfaces extending generally perpendicular to the front surface, utilizing the pattern assembly in a lost foam casting process to produce an engine block including locator surfaces corresponding to the locator surfaces of the pattern assembly, and using the locator surfaces of the engine block to locate the engine block while machining the engine block.

The invention also provides a lost foam pattern portion comprising a generally planar front surface having therein a bearing recess defined in part by a generally semicylindrical surface having therein a recess defined in part by generally planar, spaced-apart locator surfaces extending generally perpendicular to the front surface.

The invention also provides a lost foam pattern assembly comprising a crankcase section, a plurality of transfer passages having respective upper ends, and a cylinder section which is mounted on the crankcase section and which includes a primary locator and all of the upper ends of the transfer passages.

A principal feature of the invention is the provision of a lost foam pattern assembly in which the upper ends of the transfer passages are located in the same pattern portions as the primary locators. This permits maximum control during machining of the distance from the upper ends of the transfer passages to the crankshaft axis.

Other features and advantages of the invention will become apparent to those skilled in the art upon review of the following detailed description, claims and drawings.

DESCRIPTION OF THE DRAWINGS

FIG. 1 is an elevational view of a foam pattern assembly embodying the invention.

FIG. 2 is a view taken along line 2—2 in FIG. 1.

FIG. 3 is a view taken along line 3—3 in FIG. 2.

FIG. 4 is an elevational view of the opposite side of the engine block as shown in FIG. 1.

FIG. 5 is a view taken along line 5—5 in FIG. 4.

FIG. 6 is a view taken along line 6—6 in FIG. 5.

FIG. 7 is a view taken along line 7—7 in FIG. 4.

FIG. 11 is a partial sectional view similar to FIG. 7 of an engine block embodying the invention prior to machining.

FIG. 12 is a view similar to FIG. 11 of the engine block after machining.

Figure 8:
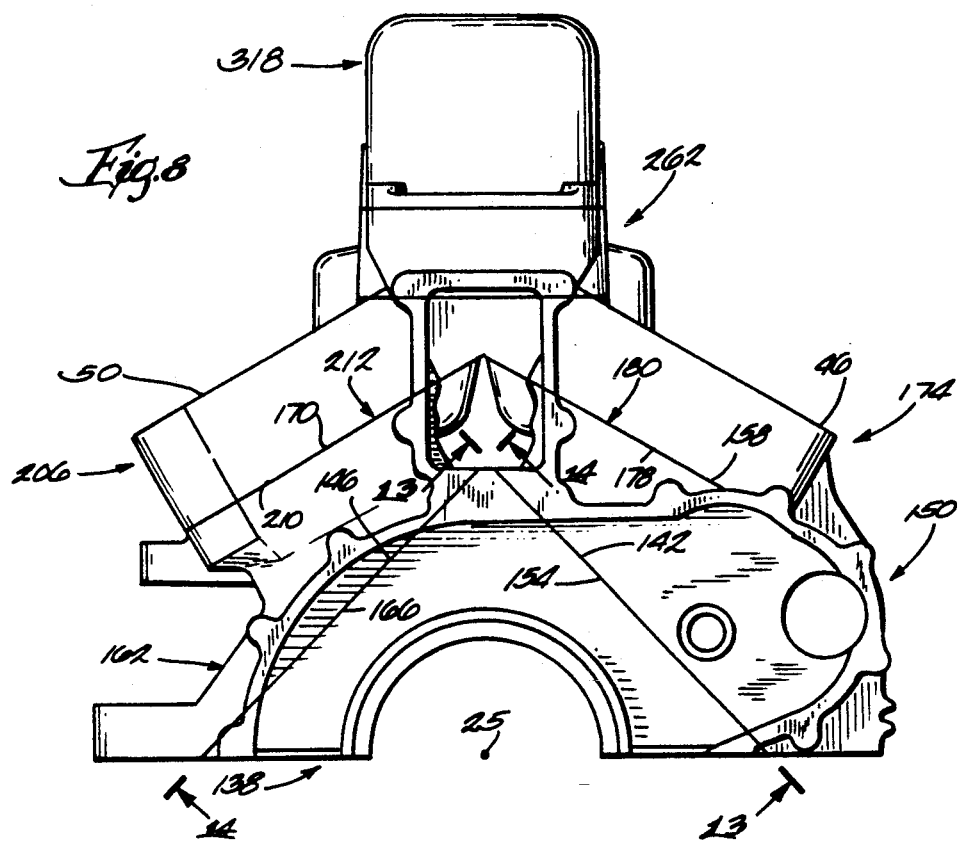
FIG. 8 is a top plan view of the engine block.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A foam pattern assembly 10 which embodies the invention and which is used in forming an engine block 14 (FIGS. 11 and 12) in a lost foam casting process is illustrated in FIGS. 1–10, 13 and 14. Except for any differences described below, the assembly 10 is substantially identical to the assembly disclosed in U.S. Ser. No. 315,900, filed Feb. 27, 1989, and common elements have been given the same reference numerals.

The foam pattern assembly 10 comprises (see FIG. 4) a generally planar first or front surface 18 having therein first, second, third, fourth, fifth and sixth crankcase-defining cavities 22a, 22b, 22c, 22d, 22e and 22f, respectively. The surface 18 also has therein a first or upper bearing recess 23a located above the first crankcase-defining cavity 22a, a second bearing recess 23b located between the second and third crankcase-defining cavities 22b and 22c, a third bearing recess 23c located between the fourth and fifth crankcase-defining cavities 22d and 22e, and a fourth or lower bearing recess 23d located below the sixth crankcase-defining cavity 22f. Each of the bearing recesses 23 is defined in part by a generally semicylindrical surface 24 that is generally centered on a crankshaft axis 25. The front surface 18 also has therein first, second and third right intake ports 26a, 26b and 26c, respectively, and first, second and third left intake ports 30a, 30b and 30c, respectively.

The assembly 10 also comprises (see FIGS. 1, 2, 5 and 8) right and left cylinder head faces 46 and 50, respectively, which correspond to faces on the resulting engine block 14 to which cylinder heads (not shown) are attached. The pattern assembly 10 also comprises (see FIGS. 1 and 2) a bank of first, second and third right cylinder bores 54a, 54b and 54c, respectively, extending from the right cylinder head face 46. The pattern assembly 10 also comprises (see FIGS. 1 and 5) a bank of first, second and third left cylinder bores 58a, 58b and 58c, respectively, extending from the left cylinder head face 50. The pattern assembly 10 also comprises (see FIGS. 9 and 13) three first right transfer passages 62a communicating between the second crankcase-defining cavity 22b and the first right cylinder bore 54a, three second right transfer passages 62b communicating between the fourth crankcase-defining cavity 22d and the second right cylinder bore 54b, and three third right transfer passages 62c communicating between the sixth crankcase-defining cavity 22f and the third right cylinder bore 54c. The assembly 10 also comprises (see FIGS. 9 and 14) three first left transfer passages 66a communicating between the first crankcase-defining cavity 22a and the first left cylinder bore 58a, three second left transfer passages 66b communicating between the third crankcase-defining cavity 22c and the second left cylinder bore 58b, and three third left transfer passages 66c communicating between the fifth crankcase-defining cavity 22e and the third left cylinder bore 58c. Each transfer passage 62 or 66 includes (see FIG. 9) an inner or lower end 67 communicating with the associated crankcase-defining cavity 22 and an outer or upper end 68 communicating with the associated cylinder bore 54 or 58.

The assembly 10 also comprises (see FIGS. 4 and 9) a first right air intake passage 70a communicating between the first right intake port 26a and the second crankcase-defining cavity 22b, a second right air intake passage 70b communicating between the second right intake port 26b and the fourth crankcase-defining cavity 22d, and a third right air intake passage 70c communicating between the third right intake port 26c and the sixth crankcase-defining cavity 22f. The assembly 10 also comprises a first left air intake passage 74a communicating between the first left intake port 30a and the first crankcase-defining cavity 22a, a second left air intake passage 74b communicating between the second left intake port 30b and the third crankcase-defining cavity 22c, and a third left air intake passage 74c communicating between the third left intake port 30c and the fifth crankcase-defining cavity 22e.

Figure 9:
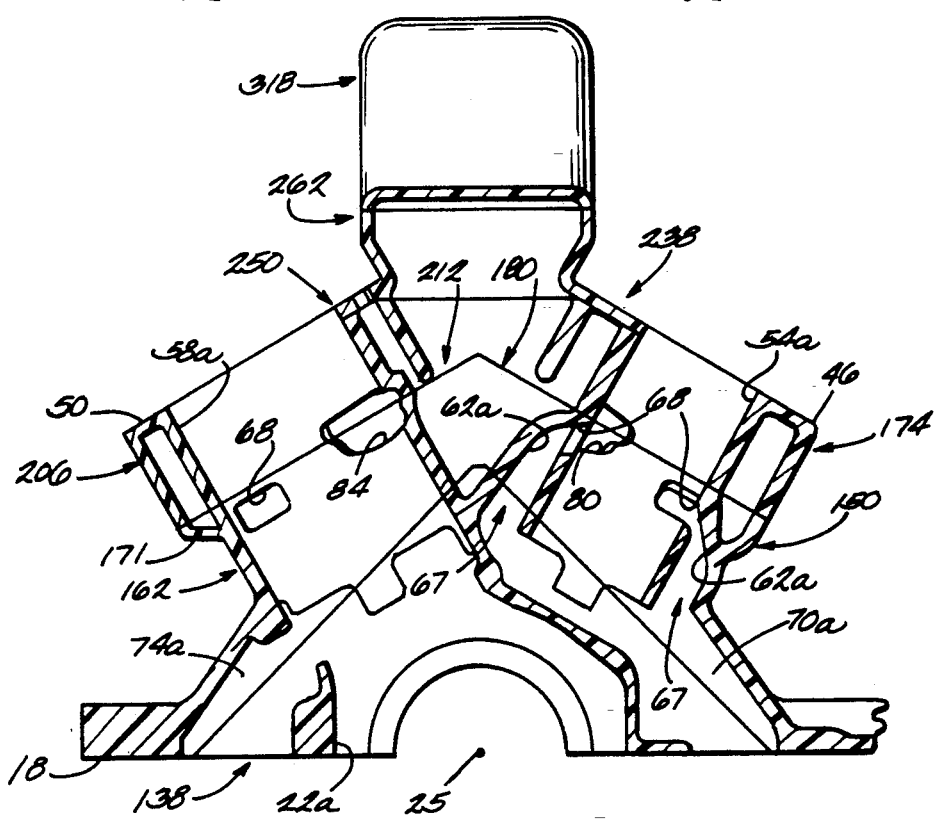
FIG. 9 is a view taken along line 9—9 in FIG. 4.
Figure 14:
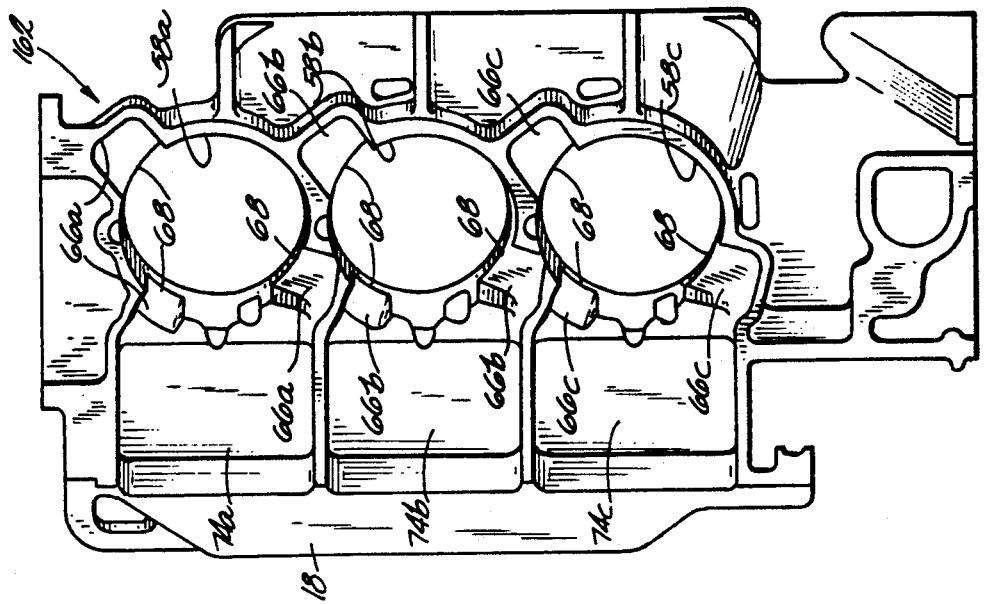
FIG. 14 is a view taken along line 14—14 in FIG. 8.
Figure 13:
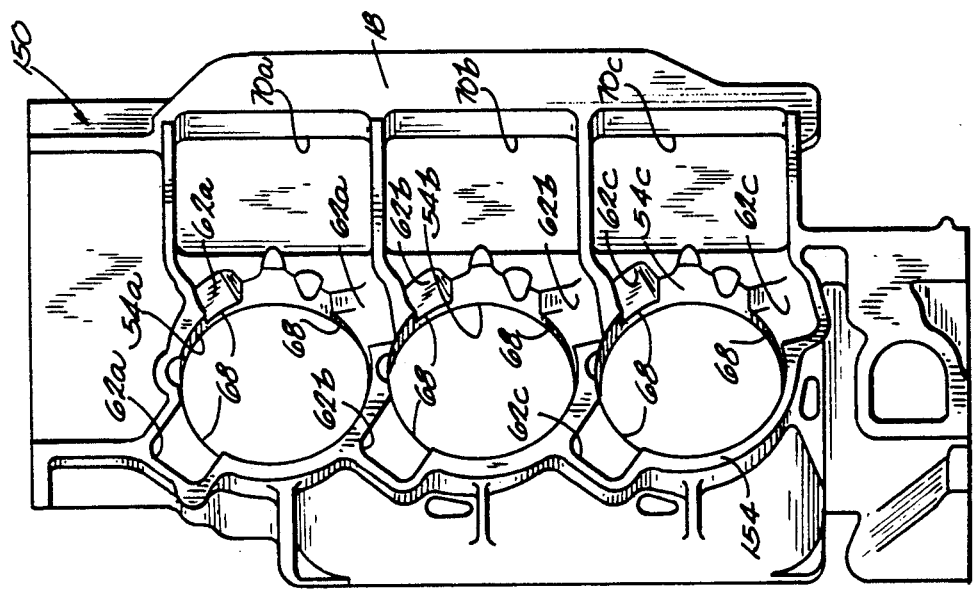
FIG. 13 is a view taken along line 13—13 in FIG. 8.
Figure 10:
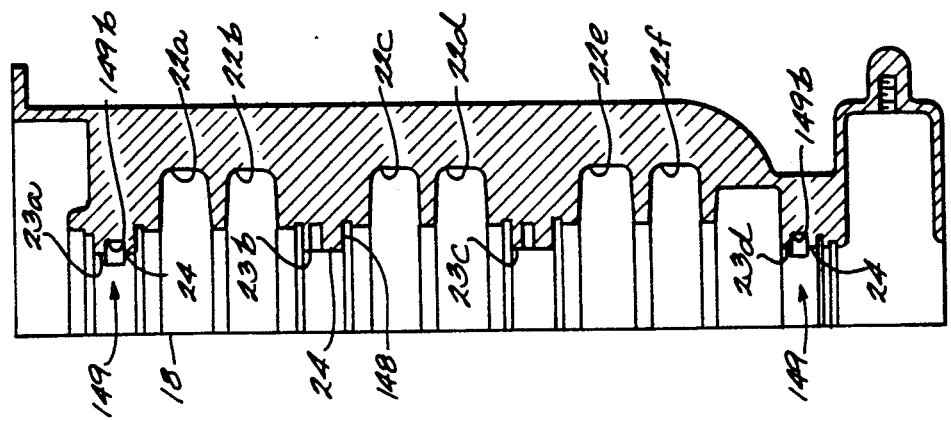
FIG. 10 is a view taken along line 10—10 in FIG. 4.

The pattern assembly 10 also comprises first, second and third right exhaust passages (not shown) respectively communicating with the first, second and third right cylinder bores 54a, 54b and 54c via respective first, second and third right exhaust ports 80 (only the first right exhaust port 80 is shown), and first, second and third left exhaust passages (not shown) respectively communicating with the first, second and third left cylinder bores 58a, 58b and 58c via respective first, second and third left exhaust ports 84 (only the first left exhaust port 84 is shown—see FIG. 9).

The pattern assembly 10 comprises eleven pieces or portions or sections. The pieces are glued together or otherwise suitably connected to form the assembly.

More particularly, the pattern assembly 10 comprises (see FIG. 8) a base or crankcase portion 138. The base portion 138 includes a portion of the front surface 18, a first or right rear mounting or glue surface 142 spaced from the front surface 18, and a second or left rear mounting or glue surface 146 spaced from the front surface 18. The base portion 138 also includes (see FIGS. 4 and 10) a generally planar, arcuate surface 148 extending generally perpendicular to the crankshaft axis 25 and intersecting the semicylindrical surface 24 of the bearing recess 23b. This surface 148 constitutes the tertiary locator or qualifying surface of the pattern assembly 10. The base portion 138 also includes (see FIGS. 4 and 7), in the semicylindrical surface 24 of each of the upper and lower bearing recesses 23a and 23d, a generally rectangular recess 149 defined by (see FIG. 7) generally planar, spaced-apart side surfaces 149a extending generally perpendicular to the front surface 18 and generally perpendicular to the surface 148, and by a generally planar end surface 149b extending generally parallel to the front surface 18 and connecting the side surfaces 149a. The side surfaces 149a constitute the secondary locators or qualifying surfaces of the foam pattern assembly 10.

The foam pattern assembly 10 also comprises (see FIG. 8) a first or right front cylinder portion 150 including a portion of the front surface 18, a generally planar front mounting or glue surface 154 mating with the right rear mounting surface 142 on the base portion 138, and a generally planar rear mounting or glue surface 158. The right front cylinder portion 150 partially defines the right cylinder bores 54 and has therein the upper ends 68 of the right transfer passages 62. The right front cylinder portion 150 also includes (see FIGS. 2 and 3) a first primary locator or qualifying surface 159 which extends parallel to the front surface 18.

The foam pattern assembly 10 also comprises (see FIG. 8) a second or left front cylinder portion 162 including a portion of the front surface 18, a generally planar front mounting or glue surface 166 mating with the left rear mounting surface 146 on the base portion 138, and a generally planar rear mounting or glue surface 170. The left front cylinder portion 162 partially defines the left cylinder bores 58 and has therein the upper ends 68 of the left transfer passages 66. The left front cylinder portion 162 also includes (see FIGS. 5, 6 and 9) second and third primary locators or qualifying surfaces 171 and 172, respectively, extending parallel to the front surface 18.

The foam pattern assembly 10 also comprises (see FIGS. 8 and 9) a first or right rear cylinder portion 174 including a generally planar front mounting or glue surface 178 mating with the rear mounting surface 158 on the right front cylinder portion 150. The front mounting surface 178 on the right rear cylinder portion 174 and the rear mounting surface 158 on the right front cylinder portion 150 define a parting line 180. As shown in FIG. 9, the parting line 180 passes through the right exhaust ports 80 but does not intersect the right transfer passages 62.

The foam pattern assembly 10 also comprises (see FIGS. 8 and 9) a second or left rear cylinder portion 206 including a generally planar front mounting or glue surface 210 mating with the rear mounting surface 170 on the left front cylinder portion 162. The rear mounting surface 170 on the left front cylinder portion 162 and the front mounting surface 210 on the left rear cylinder portion 206 define a parting line 212. As shown in FIG. 9, the parting line 212 passes through the left exhaust ports 84 but does not intersect the left transfer passages 66.

The foam pattern assembly 10 also comprises (see FIG. 9) a first or right cover portion 238, a second or left cover portion 250, a front exhaust portion 262, an intermediate exhaust portion (not shown), a rear exhaust portion (not shown), and a rear cover portion 318. These portions are shown and described in U.S. Ser. No. 315,900, filed Feb. 27, 1989, and will not be described herein in greater detail.

The engine block 14, which results when the foam pattern assembly 10 is used in a lost foam casting process, is illustrated in FIGS. 11 and 12. Elements of the engine block 14 corresponding to elements of the foam pattern assembly 10 have been given the same reference numerals. Except for any differences described below, the engine block 14 is substantially identical to the engine block disclosed in U.S. Ser. No. 316,153, filed Feb. 27, 1989.

After casting, the engine block 14 is secured in a fixture (not shown) for machining. More particularly, the primary, secondary and tertiary locators 159, 171, 172, 148 and 149a are clamped against the fixture in order to fix the position of the engine block 14. During the initial machining step, the front surface 18 is machined to the desired distance from the upper ends 68 of the transfer passages 62 and 66. The crankshaft axis 25 is located in the plane of the machined front surface 18. Also, two or more locating holes (not shown) are machined in the front surface 18. Next, the engine block 14 is secured in a second fixture (not shown). The front surface 18 is clamped against a surface of the fixture, and the fixture includes pins that extend into the above-mentioned locating holes to locate the engine block 14 on the fixture surface. Thereafter, the bearing recesses 23 are machined to the desired radius from the crankshaft axis 25. During this machining step, the surfaces 24 are machined to a radius greater than the distance from the front surface 18 to the end surfaces 149b, as shown in FIG. 12. However, a portion of each of the side surfaces 149a remains after machining. Since the secondary qualifying surfaces 149a are not totally removed during machining, dimensions relative to the secondary qualifying surfaces 149a can be checked after machining is completed.

When locating a lost foam two-stroke engine block for machining purposes, a critical as-cast dimension is the distance from the upper ends of the transfer passages to the crankshaft axis. In order to control this dimension in the machined engine block 14, the primary locators 159, 171 and 172 are located on the pattern portions in which the upper ends 68 of the transfer passages 62 and 66 are located, i.e., on the front cylinder portions 150 and 162 of the foam pattern assembly 10. The cylinder portions 150 and 162 define a pattern assembly section having therein the upper ends 68 of all of the transfer passages 62 and 66 and having thereon all of the primary locators 159, 171 and 172.

In an alternative embodiment (not shown), the cylinder portions 150 and 162 could be a single piece of foam, rather than two pieces.

Various features of the invention are set forth in the following claims.

I claim:

1. A method for manufacturing an engine block, said method comprising the steps of providing a lost foam pattern assembly comprising a crankcase section including a first surface and first and second mounting surfaces spaced from said first surface, a right cylinder section which is fixed to said first mounting surface and which includes a transfer passage outer end and a second locator, a left cylinder section which is fixed to said second mounting surface and which includes a transfer passage outer end and a second locator, utilizing said pattern assembly in a lost foam casting process to produce an engine block including locators corresponding to said locators of said pattern assembly and a first surface corresponding to said first surface of said pattern assembly, and using said locators of said engine block to locate said engine block while machining said first surface of said engine block.

2. A method as set forth in claim 1 wherein said first surface is generally planar and has therein a bearing recess defined in part by a generally semi-cylindrical surface having therein an additional recess defined in part by generally planar, spaced-apart secondary locator surfaces extending generally perpendicularly to said first surface, wherein said engine block also includes a secondary locator surfaces corresponding to said secondary locator surfaces of said crankcase section, and wherein said using step also includes the step of using said secondary locator surfaces of said engine block to locate said engine block.

3. A method as set forth in claim 2 wherein said semi-cylindrical surface has an axis, wherein said crankcase section includes a tertiary locator surface extending generally perpendicular to said axis, wherein said engine block also includes a a tertiary locator surface corresponding to said tertiary locator surface of said crankcase section, and wherein said using step also includes the step of using said tertiary locator surface of said engine block to locate said engine block.

4. A method as set forth in claim 2 wherein said semi-cylindrical surface has an axis located in the plane of said first surface, wherein said additional recess in said semi-cylindrical surface is further defined in part by a generally planar end surface extending generally parallel to said first surface, wherein said engine block also includes a semi-cylindrical surface having an axis, and an end surface corresponding to said semi-cylindrical surface, and said end surface of said crankcase section, and wherein said method further comprises the step of machining said semi-cylindrical surface of said engine block to a radius from said axis of said engine block semi-cylindrical surface greater than the distance from said first surface of said engine block to said end surface of said engine block.

5. A method for manufacturing an engine block said method comprising the steps of providing a lost foam pattern assembly comprising a crankcase section including a generally planar first surface having therein an additional bearing recess defined in part by a generally semi-cylindrical surface having therein a recess defined in part by generally planar, spaced-apart locator surfaces extending generally perpendicularly to said first surface, utilizing said pattern assembly in a lost foam casting process to produce an engine block including locator surfaces corresponding to said locator surfaces of said pattern assembly, and using said locator surfaces of said engine block to locate said engine block while machining said engine block.

6. A method as set forth in claim 5 wherein said semi-cylindrical surface of said crankcase section has an axis located in the plane of said first surface, wherein said additional recess in said semi-cylindrical surface is further defined in part by a generally planar end surface extending generally parallel to said first surface, wherein said engine block also includes a semi-cylindrical surface having an axis, and an end surface respectively corresponding to said semi-cylindrical surface and said end surface of said crankcase section, and wherein said method further comprises the step of machining said semi-cylindrical surface of said engine block to a radius from said axis of said engine block greater than the distance from said first surface of said engine block to said end surface of said engine block.

7. A method as set forth in claim 5 wherein said semi-cylindrical surface of said crankcase section has an axis and a tertiary locator surface extending generally perpendicular to said axis, wherein said semi-cylindrical surface of said engine block also includes an axis and a tertiary locator surface corresponding to said tertiary locator surface of said crankcase section, and wherein said using step also includes the step of using said tertiary locator surface of said engine block to locate said engine block.

8. A lost foam pattern portion comprising a generally planar first surface having therein a crankcase opening communicating with a cylindrical bore and also having therein a bearing recess defined in part by a generally semi-cylindrical surface having an axis located in said first surface and having therein an additional recess opening only into said bearing recess and defined in part by generally planar, spaced-apart locator surfaces extending generally perpendicularly to said first surface.

9. A lost foam pattern portion as set forth in claim 8 wherein said additional recess in said semi-cylindrical surface is also defined in part by a generally planar end surface extending between said locator surfaces and extending generally parallel to said first surface.

10. A lost foam pattern assembly for use in casting an engine block including a transfer passage having an outer end and a cast surface to be machined so as to a provide a finished surface located at a predetermined distance from the outer end of the transfer passage, said lost foam pattern assembly comprising a crankcase portion including a flat surface located in a plane and corresponding to the cast surface, and a cylinder portion which is mounted on said crankcase portion and which includes a transfer passageway corresponding to the transfer passage and having a remote end corresponding to the outer end of the transfer passage and spaced from said flat surface at a distance at least as great as the predetermined distance, and three locator surfaces which provide corresponding reference surfaces formed in the case engine block, which are usable as references for machining the cast surface so as to locate the finished surface at the predetermined distance from the outer end of the transfer passage, and which respectively include thereon points which, when projected along lines extending perpendicularly to said plane containing said flat surface, define an imaginary triangle which is located in said plane and which emcompasses a substantial portion of said flat surface.

11. An assembly as set forth in claim 10 wherein said flat surface includes therein a bearing recess, and wherein said locator surfaces are generally parallel to said flat surface.

12. A lost foam pattern assembly for use in casting a V-shaped engine block including a crankcase portion including a surface to be machined and a pair of cylinder bank portions extending from said crankcase portion, each cylinder bank portion including a cylinder bore and transfer passage with an outer end, said pattern assembly comprising a crankcase section corresponding to the crankcase portion and including first and second mounting surfaces and a surface to be machined, a first cylinder section which corresponds to one of the cylinder bank portions, which is fixed to said first mounting surface, and which includes a first cylinder bore, a first transfer passage which communicate with said first cylinder bore and which includes an outer end at the junction of said first cylinder bore and said first transfer passage, and a first outer side including thereon a first locator comprising a first surface which is located, relative to the axis of said first cylinder bore, axially adjacent said outer end of said first transfer passage and which provides a corresponding first surface on the cast engine block, and a second cylinder section which corresponds to the other of the cylinder bank portions, which is fixed to said second mounting surface, and which includes a second cylinder bore, a second transfer passage which communicates with said second cylinder bore and which includes an outer end at the junction of said first cylinder bore and said first transfer passage, and a second outer side extending thereon a second locator comprising a second surface which is located, relative to the axis of said second cylinder bore, axially adjacent said outer end of said second transfer passage, and which provides a corresponding second surface on the cast engine block, the first and second corresponding surfaces being usable as references for machining the surface to be machined at a predetermined distance from the outer ends of said transfer passages.

13. A lost foam pattern assembly for use in casting a V-shaped engine block comprising a crankcase portion including a surface to be machined and a pair of cylinder bank portions extending from said crankcase portion, each cylinder bank portion including in, aligned series, first, second, and third cylinder bores and respective transfer passages communicating with said first, second, and third cylinder bores and each having an outer end, said pattern assembly comprising a crankcase section corresponding to the crankcase portion and including first and second mounting surfaces and a surface to be machined, a first cylinder section which corresponds to one of the cylinder bank portions, which is fixed to said first mounting surface, and which includes, in aligned series, first, second, and third cylinder bores, first, second, and third transfer passages which respectively communicate with said first, second, and third cylinder bores and which respectively include outer ends at the respective junctions of said first, second, and third cylinder bores with said first, second, and third transfer passages, and a first outer side including thereon a first surface which is located, relative to the axis of said first cylinder bore, axially adjacent said outer end of said first transfer passage and which provides a corresponding first surface on the cast engine block, and a second surface which is located, relative to the axis of said third cylinder bore, axially adjacent said outer end of said third transfer passage and which provides a corresponding second surface on the cast engine block, and a second cylinder section which corresponds to the other of the cylinder bank portions, which is fixed to said second mounting surface, and which includes, in aligned series, fourth, fifth, and sixth cylinder bores, fourth, fifth, and sixth transfer passages which respectively communicate with said fourth, fifth, and sixth cylinder bores and which respectively include outer ends at the respective junctions of said fourth, fifth, and sixth cylinder bores with said fourth, fifth, and sixth transfer passages, and a second outer side including thereon a third surface which is located, relative to the axis of said fifth cylinder bore, axially adjacent said outer end of said fifth transfer passage, and which provides a corresponding third surface on the cast engine block, said first, second, and third corresponding surfaces being usable as references for machining the third crankcase section surface to be machined at a predetermined distance from said outer ends of said transfer passages.

* * * * *